United States Patent [19]

Maul et al.

[11] Patent Number: 5,540,989
[45] Date of Patent: Jul. 30, 1996

[54] MULTILAYERED HEAT-SEALABLE PLASTIC FILMS

[75] Inventors: Jürgen Maul, Marl; Werner Siol, Darmstadt-Eberstadt; Ulrich Terbrack, Reinheim, all of Germany

[73] Assignee: Roehm GmbH Chemische Fabrik, Darmstadt, Germany

[21] Appl. No.: 389,074

[22] Filed: Feb. 14, 1995

Related U.S. Application Data

[63] Continuation of Ser. No. 121,863, Sep. 17, 1993, abandoned.

[30] Foreign Application Priority Data

Sep. 19, 1992 [DE] Germany ............... 42 31 395.3
Nov. 24, 1992 [DE] Germany ............... 42 41 682.5

[51] Int. Cl.$^6$ ............... B32B 27/08; B32B 27/30; C08L 53/02; C08L 33/10
[52] U.S. Cl. ............... 428/349; 428/519; 428/520; 428/521; 428/522; 428/36.8; 525/71; 525/80; 525/87; 525/89; 525/94; 525/227; 526/328.5; 526/329.5; 526/329.7; 53/477; 53/485
[58] Field of Search ............... 428/500, 515, 428/517, 516, 519, 521, 346, 347, 349, 355, 35.2, 35.7, 36.8, 520, 522; 525/314, 302, 227, 222, 241, 89, 95, 98, 99, 71, 80, 94, 87; 526/328.5, 329.7, 329.5, 335, 340; 53/477, 485

[56] References Cited

U.S. PATENT DOCUMENTS

| | | | |
|---|---|---|---|
| 4,075,285 | 2/1978 | Tabana et al. | 260/876 B |
| 4,332,858 | 6/1982 | Saitoh et al. | 428/412 |
| 4,370,369 | 1/1983 | Bonis . | |
| 4,753,708 | 6/1988 | Markert et al. . | |
| 4,897,274 | 1/1990 | Candida et al. | 426/127 |
| 5,008,341 | 4/1991 | Bueschl et al. | 525/216 |
| 5,055,529 | 10/1991 | Kishida et al. | 525/309 |
| 5,147,930 | 9/1992 | La Fleur et al. | 525/57 |
| 5,155,172 | 10/1992 | Siol et al. | 525/308 |
| 5,208,083 | 5/1993 | Freed | 428/36.7 |
| 5,227,432 | 7/1993 | Jung | 525/286 |
| 5,237,007 | 8/1993 | Collella | 525/693 |
| 5,266,645 | 11/1993 | Siol et al. | 525/309 |
| 5,280,073 | 1/1994 | Siol et al. | 525/227 |
| 5,283,127 | 2/1994 | Blumenstein et al. | 428/476.3 |

FOREIGN PATENT DOCUMENTS

| | | |
|---|---|---|
| 0406681A2 | 1/1991 | European Pat. Off. . |
| 417570 | 3/1991 | European Pat. Off. . |
| 0437745A2 | 7/1991 | European Pat. Off. . |
| 538139 | 4/1993 | European Pat. Off. . |
| 548721 | 6/1993 | European Pat. Off. . |
| 550851 | 7/1993 | European Pat. Off. . |
| 3531036A1 | 3/1987 | Germany . |

*Primary Examiner*—Paul J. Thibodeau
*Assistant Examiner*—Vivian Chen
*Attorney, Agent, or Firm*—Oblon, Spivak, McClelland, Maier & Neustadt, P.C.

[57] ABSTRACT

The invention relates to a recyclable, heat-sealable plastic film for hermetically sealing plastic containers, comprising at least two layers which mutually adhere, (i) a support layer comprised of an impact resistant polystyrene resin and (ii) a sealing layer consisting essentially of: a) 20–100 weight % of a copolymer P consisting essentially of:

(p1) 20–90 weight % methyl methacrylate and/or ethyl methacrylate;

(p2) 10–80 weight % of at least one monomer of formula I $$CH_2=C(CH_3)-C(=O)-O-R_1, \quad (I)$$

where $R_1$ represents an $C_{3-24}$ alkyl group; and (p3) 0–10 weight %, preferably 1–8 weight %, of a monomer which is copolymerizable with and different from the monomers (p1) and (p2); and
  (b) 0–80 weight % of a block copolymer containing styrene blocks.

14 Claims, No Drawings

MULTILAYERED HEAT-SEALABLE PLASTIC FILMS

This application is a continuation of application Ser. No. 08/121,863, filed on Sep. 17, 1993, now abandoned.

FIELD OF THE INVENTION

The invention relates to heat-sealable plastic films comprised of at least two layers, a support layer and a sealing layer, which mutually adhere. The support layer comprises an impact resistant polystyrene resin. The sealing layer, which adheres to the support layer, comprises 20–100 weight % of a methacrylate copolymer. The plastic films are suitable for hermetically sealing plastic containers, such as polystyrene containers. In particular, the plastic films are suitable for sealing containers in which foodstuffs are stored.

DISCUSSION OF THE BACKGROUND

Plastic containers are currently more popular than containers composed of wood or inorganic materials such as metal, glass, or ceramics, for storage especially for food storage. An important factor in food storage, whether the food is prepared for storage by dehydration, freezing, or serialization, is the complete inhibition of microbial growth. This can be achieved by sealing foodstuffs into containers with gastight seals.

Important factors critical for preserving foodstuffs in containers with gastight seals include the mechanical strength, durability, ability to maintain water and ability to minimize the effects of the atmosphere and light on the preserved foodstuff of the gastight seals (see "Ullmann's Encyclopedia of Industrial Chemistry", 25th Ed., Verlag Chemie: Weinheim, 1985, pp. 523–560 and 583–618; the applicable standards are also discussed therein).

Previously gastight seals composed a layer of aluminum coated with a sealing coating have been used to seal plastic containers holding food, particularly dairy products such as yogurt. Aluminum seals are typically comprised of a three-layered laminate. The outer layer frequently comprises biaxially oriented polyethylene terephthalate (0-PET), biaxially oriented polypropylene (0-PP), biaxially oriented polyiamide (0-PA) or cellulose. The middle layer comprises aluminum. The heat-sealable inner layer adjoining the aluminum layer typically comprises polyethylene, ethylene copolymers, or polypropylene (Stehle, G. (1991) Neue Verpackung, 9:94–101). U.S. Pat. No. 4,753,708 describes heat-sealable coatings for metal foils which are suitable for sealing various substrates, such as polystyrene substrates. The coatings comprise a film-forming dispersion of a graft polymer based on an olefin and a (meth)acrylate, in an organic solvent. However, the use of aluminum for packaging has recently met with ecological and economic objections.

Accordingly, gas tight seals composed of plastic films with sealable coatings are being used. Hard polyvinylchloride (PVC) increasingly is widely used as a relatively inexpensive material for sealable films. Hard PVC has good mechanical strength and good barrier characteristics with regard to gas permeability. Customarily an acrylic resin is used as a sealing coating layer. The adhesiveness and melting point of the acrylic resin can be modified with additives.

Unfortunately the high permeability of certain plastics to gases and vapors can lead to problems in food preservation when the plastics are used as packaging materials. Multilayer films have been suggested to overcome this problem (see German Patent 35 31 036 and European Patents 0 406 681 and 0 437 745).

German Patent 35 31 036 describes plastic films produced by coextrusion comprising a sealable layer of an impact resistant polystyrene, a block copolymer, and a lubricant, possibly applied to a support layer.

European Patent 0 406 681, discusses the problems of using heat-sealable plastic films instead of aluminum laminates. As a rule, plastic seals require much narrower processing ranges (usually between 10° and 20° K) than aluminum seals. The processing temperature must be continuously monitored in order to ensure problem-free production and use of the sealed package. When the containers being sealed consist of a plurality of cavities which must be simultaneously filled, such as cups or the like, processing requirements are often difficult to meet. To solve these problems, European Patent 0 406 681 describes a plastic film produced by coextrusion or roll-lamination of two or three layers (optionally separated by intermediate layers), wherein each layer contains an adhesive for binding the layers together. The film comprises 1–50% of a layer of a heat-sealable impact resistant polystyrene, up to 95% of a support layer, and 1–99% of a high melting plastic layer, wherein the sum of the thicknesses or weights of all layers is 100%.

European Patent 0 437 745 describes a sealable thermoplastic molding compound comprising at least four components: an impact resistant polystyrene resin, a block copolymer, a lubricant, and at least one homo- or copolymer of an aliphatic olefin. The sealable molding compound is applied to conventional support films, preferably comprised of polystyrene. The films are useful for sealing polystyrene or polyolefin (such as polyethylene or polypropylene) containers.

Unfortunately, multilayer films are expensive, difficult to dispose of properly and cannot be recycled. A heat-sealable film which is suitable for gastight sealing of plastic containers, particularly polystyrene containers, in a homogeneous layer and without additional surface treatment, is described in German Patent Applications P 41 42 691.6 and P 41 42 692.4. These films are directly sealable to polystyrene with the use of ordinary apparatus. These heat-sealable plastic films are based on polystyrene-compatible methacrylates comprising a molding compound with a two-phase structure. The grafting branches, and the ungrafted parts, of the impact resistant phase, are compatible with polystyrene. German Patent Applications P 41 42 691.6 and P 41 42 692.4 also relate to multilayer composite films wherein the abovementioned molding compounds are processed to form support films and in a second step are coated with polystyrene-compatible molding compounds which have a two-phase structure.

However, in the case of multilayer composite films comprised of a support film produced from a polystyrene-compatible molding compound with a two-phase structure and a sealing layer comprised of a polystyrene-compatible readily flowable molding compound, a large difference in viscosity between the molding compound of the support layer and the molding compound of the sealing layer exists which creates problems in processing. Further, these (meth)acrylate films do not always have adequate tear strength under mechanical load.

SUMMARY OF THE INVENTION

Accordingly, one object of the present invention is to provide a heat-sealable plastic film which has good recyclability, mechanical stability, processibility, and manufacturability (particularly by coextrusion).

The present inventors have now found that this object can be achieved by a heat-sealable plastic film comprising at least two layers, a support layer and a sealing layer, which mutually adhere. The support layer comprises an impact resistant polystyrene resin (PS), and the sealing layer, which adheres to the support layer, comprises 20–100 weight % of a copolymer (copolymer P) consisting essentially of:

p1) 20–90 weight %, based on the total weight of copolymer P, of methyl methacrylate, ethyl methacrylate or a combination thereof;

p2) 10–70 weight %, based on the total weight of copolymer P, of at least one monomer of formula I:

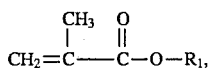

where $R_1$ is a $C_{3-24}$ alkyl group; and p3) 0–10 weight % preferably 1–8 weight %, based on the total weight of copolymer P, of a monomer which is copolymerizable with and different from the monomers (p1) and (p2); such that the sum of the proportions of the monomers (p1) , (p2) and (p3) is 100 weight %.

The sealing layer, where not comprised of 100 weight % of copolymer P, comprises up to 80 weight % of one or more additional polymers, such as styrene-butadiene-styrene block copolymers, which, in particular, improve the impact strength of the sealing layer and its processibility in an extruder.

The support layer may comprise copolymer P, or other components of the sealing layer, in proportions of 1–50 weight %. Likewise, the sealing layer may comprise components of the support layer in proportions up to 80 weight %, preferably 0.1–60 weight %. It is preferred that the content of copolymer P in the sealing layer is greater than the content of copolymer P in the support layer, by at least 20 weight % units, preferably 40 weight % units. This is particularly important from the standpoint of reusability of punching wastes.

In general the thickness of the plastic film is in the range 80–500 micron; the thickness of the support layer is 5–495 micron layer and the thickness of the sealing layer is 2–495 micron. If an impact-strength-modified sealing layer, for example a sealing layer comprising 50 weight % of copolymer P and 50 weight % of styrene-butadiene-styrene block copolymer, is used, the sealing layer may be much thicker, because in such a case there is no embrittlement of the whole system by an excessively thick, brittle sealing layer. The plastic film may also contain a third layer which inhibits adhesion of the plastic film to the sealing head.

DETAILED DESCRIPTION OF THE PREFERRED EMBODIMENTS

Suitable impact resistant polystyrene resins (PS) in accordance with the present invention are two-phase polymer mixtures comprising (i) a polymeric hard phase which forms a matrix and which preferably contains vinylaromatic monomer units and (ii) a polymeric impact resistant phase formed by 0.01–20 micron particles which are finely dispersed in the hard phase matrix. The polymeric hard phase is preferably 50–95 weight %, more preferably 60–95 weight %, and particularly preferably 80–95 weight %, of the total weight of the two-phase polymer mixture.

Suitable vinylaromatic monomer units useful in the hard phase include styrene, α-methylstyrene, p-methylstyrene, or other substituted styrenes and mixtures thereof. Preferably styrene is used. The weight average molecular weights of the hard phase polymers are in the range 50,000–500,000 Dalton, preferably 100,000–350,000 Dalton.

Suitable polymers useful for the impact resistant phase have glass transition temperatures < 10° C., preferably < –10° C., and ordinarily are classified as "elastomers" or "rubbers". Crosslinked and uncrosslinked polymers of polysiloxanes, ethylene-vinyl acetate copolymers, polyacrylates, or polyolefins are suitably used. Preferably, polyolefins are used, particularly preferably polydienes.

Suitable polyolefins useful in the impact resistant phase include homo- or copolymers of ethylene, propylene, or isobutylene (see "Ullmanns Enzyklopaedie der technischen Chemie" 4th Ed Vol 19 Verlag Chemie, 1980 pp 167–226) In general, the weight average molecular weight of the uncrosslinked polyolefins is of from 50,000–1,000,000 Dalton (determined, for example by gel permeation chromatography as described by Mark et al., "Encyclopedia of Polymer Science and Engineering", 2nd Ed., Vol. 10, J. Wiley, 1987, pp. 1–19). Preferably, ethylene-propylene-diene (EPDM) terpolymers, wherein the diene component is dicyclopentadiene, ethylidenenorbornene, or hexadiene, are used (see Ullmann, supra 4th Ed., Vol. 13, pp. 619–621; Kirk-Othmer, "Encyclopedia of Industrial Chemistry" 3rd Ed Vol 8 J. Wiley, 1979, pp. 492–500 and Vol. 7, pp. 687 and 693. Cesca, S., *J. Polym. Sci., Macromol. Rev.*, 1975, 10: 1) EPDM terpolymers can be produced as described in the above references, the text of which are incorporated herein by reference.

Particularly preferred polydienes comprise the well known rubber types including polybutadiene, poly-2-chlorobutadiene, or polyisoprene (see Ullmann, supra, 4th Ed., Vol. 13, pp. 595–635). Preferably the impact resistant phase comprises polybutadiene, particularly preferably grafted with styrene monomer units. In this case, medium-cis or high-cis polybutadienes with weight average molecular weights of 70,000–450,000 Dalton are preferably used. The impact resistant phase is finely dispersed in the hard phase matrix. The impact resistant particles are present in the hard phase in proportions of 5–50 weight %, preferably 5–40 weight %, particularly preferably 5–20 weight %, based on the total weight of the two phase polymer mixture. The mean particle sizes of the dispersed impact resistant phase, are in the range 0.01–20 micron, preferably 0.3–10 micron, and can be determined, for example, by electron microscopy.

Suitable impact resistant polystyrene resins (PS) in accordance with the present invention can be produced by conventional methods. High impact polystyrene resins can be manufactured, for example, by polymerization in bulk, suspension polymerization or emulsion polymerization (see Kirk-Othmer, supra, Vol. 17, 1982, pp. 470–471, and Vol. 21, 1983, pp. 811–816). Preferably the monomers comprising the hard phase are polymerized in the presence of the impact resistant particles by radical initiation.

The impact resistant polystyrene resin (PS) can also contain styrene-butadiene block copolymers and/or styrene-isoprene block copolymers, wherein multiblock copolymers such as 2-block-, 3-block-, and star-block copolymers can be used. (For synthesis of block polymers of styrene and a second monomer, see, for example, Houben-Weyl, "Methoden der organischen Chemie", 4th Ed., Vol. E20 Part 2, Georg Thieme: Stuttgart, 1987, pp. 987–993). Preferably, styrene-butadiene-styrene 3-block copolymers or star-shaped styrene-butadiene copolymers with a high content of butadiene, >50 weight %, are suitable for modifying the polystyrene resins, particularly for modifying the tear strength. In a preferred embodiment the polystyrene resins comprise at least 2 weight % of a styrene-butadiene-styrene block copolymer, and in a particularly preferred embodiment 5–20 weight % of a styrenebutadiene-styrene block copolymer comprising 50–80 weight % of butadiene components, based on the total weight of the polystyrene resin.

Alternatively, the impact resistant polystyrene resin (PS) can be comprised entirely of block copolymers. In this case, a smaller proportion of the butadiene in the block copolymer is used, so that the overall content of butadiene in the polystyrene resin is < 50 weight %, preferably < 40 weight %, and particularly preferably in the range 10–30 weight %.

The polystyrene resin (PS) can also contain additional polymer components, such as polybutylene, in amounts of 2–6 weight % based on the total weight of the polystyrene resin, or can contain the components of the sealing layer in proportions of up to 50 weight % based on the total weight of the polystyrene resin.

The polystyrene resin (PS) can also comprise a mixture of the described multiblock polymers, such as polymers having >50 weight % polybutadiene and polymers having < 50 weight % polybutadiene (for example, up to 15 weight %); and further can comprise impact resistant styrene polymers produced by radical polymerization, which polymers have the characteristic particle structure of impact resistant polystyrene. Another component of the mixture can be polystyrene which contains no polybutadiene.

Particularly preferred polystyrene resins (PS) are impact resistant polystyrene types which contain particles of an impact-resistant phase—obtained, for example, by radical polymerization of styrene in the presence of polybutadiene. As a rule, the particles of the elastomer phase have mean sizes of 1–5 micron, preferably 2–4 micron, wherewith the polybutadiene content of this polystyrene resin containing particles of the impact resistant phase is in general 7–15 weight %, preferably 8–11 weight % (based on the total weight of the polystyrene resin). The polystyrene resin can also contain the usual additives employed in polymer processing for including lubricants (such as paraffin oil), stabilizers (e.g. radical scavengers), and/or pigments.

The sealing layer comprises 20–100 weight %, in general at least 30 weight %, preferably 40–90 weight %, and particularly preferably 45–75 weight %, based on the total weight of the sealing layer, of copolymer P.

Other components of the sealing layer, other than copolymer P, can be present in proportions up to 80 weight %, and in the preferred composition up to 50 weight %. These other components modify the impact strength of the sealing layer, or modify the melt rheology during processing.

Suitably copolymer P consists essentially of the above-mentioned components (p1), (p2), and (p3). That is, the sum of the monomer units (p1), (p2), and (p3) is 100 weight %. Copolymer P is suitably formed from the monomers (p1), (p2), and optionally (p3) by conventional methods such as radical or anionic polymerization (see Rauch-Puntigam, H., and Voelker, T., 1967, "Acryl- und Methacrylverbindungen", Springer-Verlag, Heidelberg; and Houben-Weyl, 1961, 4th Ed., Vol. XIV/1, Georg Thieme, pp. 1010; the texts of which are incorporated herein by reference), and/or by group transfer polymerization (see, Houben-Weyl, 1987, supra. Vol. E20, pp. 153–160, the text of which is incorporated herein by reference). Copolymer P can suitably be polymerized in bulk, in suspension, in emulsion, or in solution.

In the case of radical polymerization, suitable initiators include peroxide compounds, particularly organic peroxides such as dibenzoyl peroxide or lauroyl peroxide, peresters such as t-butyl perneodecanoate or t-butyl per-2-ethylhexanoate, perketals, azo compounds such as azodiisobutyronitrile, or redox initiators. The initiators suitably are used in amounts of 0.01–5 weight % (based on the total weight of the monomers).

Radical polymerization can alternatively be initiated by high energy radiation. Suitable polymerization regulators include sulfur compounds such as mercapto compounds, in amounts of 0.1–5 weight % (based on the total weight of the monomers).

The weight average molecular weight of colpolymer P is suitably 2,000–1,000,000 Dalton, preferably 10,000–200,000 Dalton, particularly preferably 20,000–100,000 Dalton, (determined, for example, by GPC).

The nonuniformity of copolymer P is suitably in the range 0.1–3. The nonuniformity is calculated according to the formula:

$$U = Mw/Mn - 1,$$

where Mw is the mean molecular weight of copolymer P and Mn is the number average molecular weight of copolymer P.

Preferably copolymer P contains 20–90 weight % of monomer units (p1) and 10–80 weight % of monomer units (p2) of the formula (I), where $R_1$ represents a $C_{3-24}$ alkyl group, preferably a $C_{4-18}$ alkyl group.

Preferably the relative proportion of monomer (p2) in copolymer P decreases as the number of carbon atoms in $R_1$ increases. Quantitatively, the proportion of monomers (p2) in copolymer P may be expressed as follows (see German Patent 37 30 025 also U.S. Pat. No. 4,952,455):

$$\text{weight \% of monomer } p2 = \frac{\text{Molecular weight of monomer } p1}{(\text{Molecular weight of monomer } p1 + \text{Molecular weight of monomer } p2)} \times 100$$

Suitable monomers (p2) according to formula (I) are methacrylic acid esters wherein $R_1$ represents propyl, n-butyl, isobutyl, amyl, isoamyl, n-pentyl, n-hexyl, n-octyl, 2-ethylhexyl, n-decyl, n-dodecyl, n-tetradecyl, n-hexadecyl, n-stearyl or the alkyl group of a tallow fatty alcohol. $R_1$ can also represent a substituted or unsubstituted cycloalkyl group such as cyclopentyl, cyclohexyl, or cycloheptyl. Suitable substituents include methyl, ethyl or butyl. Preferably $R_1$ is cyclohexyl.

Suitable comonomers (p3) are present in copolymer P in amounts of 0–10 weight %, preferably 1–8 weight %. Suitable comonomers (p3) include (meth)acrylic acid, salts of (meth)acrylic acid, hydroxyalkyl esters of (meth)acrylic acid (such as 2-hydroxyethyl (meth) acrylate, or 2-hydroxypropyl (meth)acrylate), alkoxyalkyl esters of (meth)acrylic acid (such as 2-butoxyethyl (meth)acrylate or 2-methoxyethyl (meth)acrylate) and aminoalkyl esters of (meth) acrylic acid (such as 2-dimethylaminoethyl (meth)acrylate, 2,2,6,6-tetramethyl-4-piperidyl (meth) acrylate, and 3-dimethylaminopropyl (meth)acrylate). Alternatively, (p3) is styrene or a $C_{1-20}$ ester of acrylic acid. Suitably, the proportion of acrylic acid esters in copolymer P is limited to < 5 weight %, preferably < 1 weight %, and particularly preferably zero.

In accordance with the present invention, copolymer P forms a compatible polymeric mixture with the impact resistant polystyrene resin (PS). The polymeric mixture can be characterized according to recognized criteria (see Kirk-othmer, supra, Vol. 18, pp. 457–460; and Brandrup et al. "Polymer Handbook", 2nd Ed., Vol. III, Wiley Interscience, 1975, p. 211). The compatible polymer mixture suitably has a single index of refraction and a single glass transition temperature which is between the glass transition temperatures of the two components, copolymer P and the polymeric hard phase of the impact resistant polystyrene resin (PS).

As a further indication of the compatibility of the polymeric mixture, there is the occurrence of an LCST. This phenomenon occurs when upon heating a clear, transparent polymeric mixture separates into different phases and becomes optically cloudy. This is unambiguous evidence that the original polymer mixture comprised a single phase in thermodynamic equilibrium (see, Paul, D. R., "Polymer Blends and Mixtures" Martinus Nijhoff, Dordrecht and Boston, 1985, pp. 1–3). Although the polymer mixture of the present invention is not complete compatibility in the sense of a polymer blend with only a single glass temperature which is dependent upon composition, the plastic film of the present invention adheres well to polystyrene substrates when the composition of copolymer P is strictly observed. Further, the total assembly can be recycled easily, as a consequence of the good compatibility of the plastic film and the polystyrene substrate which is to be sealed.

According to the invention, copolymer P can be 40–60 weight % methyl methacrylate and 60–40 weight % butyl methacrylate. Alternatively, copolymer P can be 70 weight % methyl methacrylate and 30 weight % n-decyl methacrylate.

Preferably, the number of carbon atoms in the substituent $R_1$ of monomer component (p2) should exceed the number of carbon atoms in the methyl or ethyl substituent of monomer component (p1) by $\geq 2$, particularly preferably $\geq 3$. Preferably, copolymer P comprises 50 weight % methyl methacrylate and 50 weight % butyl methacrylate with a J-value of 15–70 ml/g, preferably J= 20–40 ml/g. (See DIN 51 562 for the determination of the J-value, which is performed in chloroform at 25° C. and is a measure of the molecular weight of the copolymer) or approximately 50 weight % ethyl methacrylate and approximately 50 weight % butyl methacrylate with a J-value of 20–50, preferably 25–40 ml/g.

Preferably the sealing layer comprises polymeric mixtures comprised of 20–90 weight % of the above-described copolymer P and 80–10 weight % of one or more block copolymers comprised of at least one block of one or more monomers selected from styrene, α-methylstyrene, and alkyl substituted styrene, and at least one block selected from isoprene and butadiene. The block copolymers can be linear, branched, or star-shaped.

Particularly preferred block copolymers in the polymeric mixture comprise 2 or more polystyrene blocks such as linear styrene-butadiene-styrene (SBS) 3-block copolymers, and radial or star-shaped SBS block copolymers. Particularly preferred are SBS block polymers which contain at most 50 weight % of styrene blocks; and still more preferred are linear SBS tri-block copolymers having a butadiene content of approximately 70 weight %.

In addition to the abovementioned block copolymers with a high butadiene content, styrene-butadiene block copolymers with butadiene contents of < 50 weight % can also be present in the polymeric mixture, in fact as low as 15 weight %, particularly 30–18 weight %.

Polymeric mixtures of the abovementioned SBS block copolymers with copolymer P are much more impact resistant than copolymer P itself. Thus, such mixtures display high extensibility and tear strength. The mixtures comprising block copolymers and copolymer P on impact resistant support materials (PS) can be sealed to impact resistant polystyrene at low temperatures (e.g. 140°–200° C.). Particularly advantageous is the good behavior of these mixtures as sealants when the plastic containers sealed with them are opened. Plastic containers sealed with them can be opened smoothly and compliantly (peeled) without jerking action.

Further, the flow behavior of the block copolymer—copolymer P mixture matches that of the impact resistant support material, so that simple coextrusion of the sealing layer on the support is possible.

For example, if one starts with a low molecular weight copolymer P (such as a copolymer of 50 parts methyl methacrylate and 50 parts butyl methacrylate, with J= 23 ml/g), then the torque measured for this material in a measuring kneader at 190° C. is close to 0 Nm. By mixing 50 parts of this extremely flowable material with 50 parts of CARIFLEX® TR 1102 (an SBS block copolymer with approximately 70% butadiene which is available from Shell), one obtains a flowable coextrusion compound which gives a torque on the same measuring kneader of 3.1 Nm.

If the proportion of the SBS block copolymer is increased, the torque is increased (for example, torque 4.6 Nm for a mixture of 70 parts CARIFLEX® TR 1102 and 30 parts of a copolymer of 50 parts methyl methacrylate units and 50 parts butyl methacrylate units, with J= 23 ml/g).

In general, mixtures of 75–25 parts of block copolymer(s) and 25–75 parts copolymer(s) (P) are used. Particularly interesting are mixtures in the weight ratio range 65:35 to 35:65.

In addition to the above-described SBS block copolymers with high (> 50 weight %) butadiene content, block copolymers with, 15–40 weight % butadiene can be used. These latter are generally highly transparent, impact resistant polystyrene molding compounds. These block copolymers are also very suitable to use in the sealing layer for modifying the rheology of the copolymers. In general, however, the pulling-away (peeling) behavior (upon opening) of containers sealed with mixtures with SBS block copolymers having butadiene content > 50% is better than that for containers sealed with these sealing layers. Preferably the sealing comprises at least 3 components, (i) copolymer P (in the amount of 45–65 weight %), (ii) the block copolymers with butadiene content > 50 weight percent (in the amount of 10–35 weight %), and (iii) the block copolymers with butadiene content 15–50 weight percent (in the amount of 10–35 weight %). The weight average molecular weights of the SBS block copolymers used are in the range 50,000–500,000 Dalton, preferably 80,000–300,000 Dalton, and particularly preferably 100,000–250,000 Dalton. The melt-flow index of the SBS-block copolymers (without addition of copolymers) is generally in the range 4–20 g/10 min, preferably 5–10 g/10 min, at 200° C. (for 5 kg).

Beside these particularly preferred styrene-butadiene block copolymers, the corresponding block copolymers based on isoprene, or the corresponding hydrogenated block copolymers comprising styrene-(ethylene-butylene)-styrene block copolymers and/or styrene-(ethylene-propylene)-styrene block copolymers, can also be employed. The synthesis of the styrene-butadiene or styrene-isoprene block copolymers is carried out in general by means of anionic polymerization (see Houben-Weyl, supra, 4th Ed., Vol. E20/2, p. 989), usually with alkyllithiums as initiators.

In addition to the above-mentioned modification of the copolymers by mixing with block copolymers based on SBS, modification is possible by means of elastomer-copolymer graft products. Of particular interest are emulsion polymers with a core-and-shell structure wherein a shell comprised of copolymer is at least partially grafted onto an acrylate rubber (such as butyl acrylate crosslinked with allyl methacrylate). Such impact strength-modified copolymers with an elastomer content of 1–65 weight %, preferably 10–50 weight %, are suitable for use as such or in a mixture with other copolymers, as the sealing layer. Also the coextrudability of the sealing layer can be improved in this manner (see Examples).

Sealing layers produced in this manner and with this composition have high flowabilities and can be used to seal a suitable substrate (as a rule, polystyrene) at quite low temperatures (130°–200° C.).

The plastic films of the present invention comprise at least two mutually adhering layers and can be fabricated by conventional methods, for example, by extrusion of the individual layers followed by lamination of the layers together (see Mark, H. F., et al., 1988, supra, Vol. 11, pp. 269–271, and Vol. 4, p. 816; 1988, "Ullmann's Encyclopedia of Industrial Chemistry", supra, Vol. All, pp. 85–111; and Hensen et al., 1986, "Handbuch der Kunststoff-Extrusionstechnik", Vol. II ("Extrusionsanlagen"), pub. Carl Hanser).

The thickness of the film is suitably in the range 80–500 micron, preferably 120–350 micron. The thickness of the support layer is suitably 5–495 micron, preferably 50–300 micron. The thickness of the sealing layer is suitably 2–495 micron, preferably 5–100 micron. The particularly preferred sealing layer comprises a mixture containing 20–90 weight % of the impact resistant polystyrene resin (PS), which preferably is one of the above-mentioned styrene-containing block copolymers, and has a thickness of 5–495 micron, preferably 20–150 micron. When the sealing layer comprises 100 weight % of copolymer P, the thickness of the sealing layer is preferably 2–100 micron, particularly preferably 4–40 micron. If the thickness exceeds 100 microns, the sealing layer can become brittle and separate from the support layer. Coextrusion is a particularly suitable method for producing the heat-sealable plastic films of the present invention, because in general the difference in flow behavior between the impact resistant polystyrene resin forming the support layer and the sealant containing copolymer is very small.

For this reason, very uniform layer thicknesses can be attained for the support layer and sealing layer, with the desired thicknesses. In particular, for a thin sealing layer < 20 micron, it is necessary to have similar flow behaviors for both the support layer material and the sealing layer material for homogeneous application of the sealing layer.

The sealing layer can also be applied to the support material by lacquering techniques. In such cases, care must be taken such that the solvent of copolymer P only dissolves the support layer on the surface when the lacquer formulation is applied. In other words, the solvent of copolymer P is a weak solvent for the impact resistant support materials(PS), In this instance, pure copolymer P can also be used for the sealing layer.

The plastic films of the present invention can be heat-sealed without problems (see Stehle, G., "Neue Verpackung", supra), and have good processing reliability. The plastic films are deep-drawable, stampable, punchable, and pressable. They can be successfully colored by the conventional coloration methods for plastics (see Becker-Braun, 1990, "Kunststoff-Handbuch", Vol. 1, Carl Hanser, pp. 539–540).

The plastic films are particularly advantageously used for sealing plastic containers, especially containers comprised of polystyrene and impact-strength-modified polystyrene. Plastic containers sealed with the plastic films according to the present invention satisfy very well the above-stated requirements for mechanical and chemical stability, thermal behavior, and processibility. The sealing conditions (such as the temperature of the sealing coating, or the pressure) can be varied within wide limits.

Of particular interest is the fact that the films are easy to seal, allowing sealing in 0.5 sec at 140° C., even using a film 100 micron thick. Thicker films require correspondingly higher temperatures or longer sealing times. This is principally a consequence of the extremely good heat-sealability of the sealant.

The low sealing temperatures frequently render unnecessary an antiblock coating to impede adhesion of the film to the hot sealing head.

In general, however, it is advantageous if the plastic film contains an additional protective layer which impedes baking to the sealing head. This layer can be comprised of the protective coating material used to mark the container; or the plastic film can have an antiblock layer which is 2–50 micron, preferably 5–20 micron thick, comprised of a high melting plastic which does not adhere to the sealing head at temperatures up to 200° C. (preferably up to 250° C.). The additional protective layer is preferably applied on the face associated with the support material. Suitable high melting plastics include polyamides (such as Polyamide 6), or polyterephthalic acid esters (such as polybutylene terephthalate), or impact-strength-modified polyphenylene ethers (PPEs), or any polymers with softening point > 160° C.

Further, the plastic film can contain additional layers, such as an intermediate layer between the support and sealing layers, which preferably comprise recycled film material.

A particular advantage of the inventive multilayer plastic films, however, is that the individual layers of the film adhere to each other directly without any primer.

In addition, the plastic film wastes can be entirely recycled, for example recycled film material can generally be used directly as a component in the production of the support layer or the sealing layer. If the sealing layer S is suitably thin, recycle proportions of up to 100% are possible. Further, the following properties should be noted:

The films are suitable for stamping, punching, and pressing;

In the case of punching, the wastes can be reprocessed to produce new films;

The films accept printing;

The plastic films, and if necessary the support films, can be produced to have high impact strength, so as to be usable under high load-bearing and high stacking conditions;

Copolymer P, the impact resistant polystyrene resin (PS), and the (optionally impact resistant) polystyrene of the container are compatible, so that one can recycle the containers and covers together;

The inventive films can be sealed directly to polystyrene. In general, the cover films are sealed to containers comprised of impact resistant polystyrene, which is, as a rule, extrusion polystyrene, such as VESTYRON® 638. Frequently the impact resistant polystyrenes used for the containers contain additional highly transparent polystyrene, for example, a container can be produced from a mixture of VESTYRON® 638 and VESTYRON® 224 (both products of Huels AG); and The films can be sealed on apparatus customarily used for heat sealing (examples of conditions: sealing pressure > 2 bar, time 0.1–2 sec, sealing temperature 130°–220° C.).

Preferably sealing heads are used which have a coating of Teflon or another material which impedes blocking. If the sealing film itself is provided with a non-blocking final coating or has an antiblock layer Z, one can employ a metallic sealing head, such as an aluminum sealing head.

The inventive films can be adjusted such that punching wastes or other residues of the film are used in their entirety to produce a new plastic film, or a new support film; in the latter case the sealing layer must be comprised only of fresh material, because the support and sealing layers are miscible in arbitrary proportions. Obviously, all of the components of the plastic film which are subject to come into contact with foods have minimum contents of residual monomers and other components which can detract from the usability of the film.

Having generally described this invention, a further understanding can be obtained by reference to certain specific examples which are provided herein for purposes of illustration only and are not intended to be limiting unless otherwise specified.

EXAMPLES

Example 1: Production of a copolymer P1 by bulk polymerization:

1.5 g t-butyl perneodecanoate and 0.5 g t-butyl per-2-ethylhexanoate were added to a mixture of 500 g methyl methacrylate, 500 g butyl methacrylate, and 10 g dodecyl mercaptan. The mixture was charged to a plastic jar (HOSTAPHAN®, produced by Hoechst AG), and was polymerized in a water bath for 24 hours at 45° C., followed by 10 hr at 80° C.

The resulting copolymer block was comminuted in a mill, and the mill granules were then further comminuted, and degassed, in an extruder.

A highly transparent, very readily flowing copolymer was obtained. J= 23 ml/g.

Example 2: Production of a copolymer P2 by emulsion polymerization:

In a 100 L stirred, heated vessel under a protective gas (argon), 15 kg methyl methacrylate, 15 kg butyl methacrylate, and 100 g 2-ethylhexyl thioglycolate were emulsified in a solution of 150 g sodium tetradecylsulfonate in 44 kg water. The mixture was then heated to 30° C. 6 g of a 1% iron(II) sulfate solution and 15 g ammonium peroxydisulfate (dissolved in 1,000 g water) were added, and the polymerization was then started by addition of 3 g sodium bisulfite (dissolved in 100 g water). When the polymerization temperature reached its maximum point (c. 70° C.), stirring was continued an additional 1 hr at 70° C. Then the mixture was cooled to room temperature, under stirring.

Examples 3 to 8: Production of copolymers P3 to P8 by bulk polymerization:

The polymerization was performed using the method described in Example 1, except that 500 g ethyl methacrylate and 500 g butyl methacrylate was used.

Dodecyl mercaptan was used as a regulator. In Examples 3–8 the concentration of the regulator was varied, thereby changing the J-value (see Table 1).

TABLE 1

| Example (Polymer no.) | Amount of dodecyl mercaptan (g) | J (ml/g) |
| --- | --- | --- |
| 3 (P3) | 3 | 51 |
| 4 (P4) | 4 | 41 |
| 5 (P5) | 5 | 36 |
| 6 (P6) | 7 | 28 |

TABLE 1-continued

| Example (Polymer no.) | Amount of dodecyl mercaptan (g) | J (ml/g) |
| --- | --- | --- |
| 7 (P7) | 8 | 25 |
| 8 (P8) | 9 | 23 |

In each case a highly transparent polymer was obtained which was comminuted to a powder.

Example 9: Production and characterization of two-phase, heat-sealable plastic films KF1 and KF2:

A 100 micron thick wet film of a solution of 10 g of a methyl methacrylate-butyl methacrylate copolymer P1 according to Example I in a mixture of 79.5% 2-propanol, 20% acetone, and 0.5% 4-hydroxy-4-methyl-2-pentanone was applied with the aid of a grooved doctor to a 250 micron thick impact resistant polystyrene film (VESTYRON® 624, available from Huels AG) containing 10 weight % of the additive CARIFLEX® TR 1102.

The result was a 260 micron thick plastic film KF1 with a sealing layer 10 micron thick.

This film was used to seal polystyrene strips 1.5 cm wide (sealing surface 1.5×1.0 cm, sealing pressure 2.5 bar). The following sealing result was obtained, which was dependent on temperature and sealing time:

Sealing temperature 220° C.

Sealing time 0.5 sec

Good seal strength.

Also, a 120 micron thick impact resistant polystyrene film (VESTYRON® 624, containing 10 weight % of the additive CARIFLEX® TR 1102) was provided with a 10 micron thick layer of copolymer P1 of Example 1, by the method described above. The result was a film KF2 of total thickness 120 micron which could be sealed to impact resistant polystyrene even at low temperatures, because of its thinness.

Sealing pressure 2.5 bar.

Sealing temperature 180° C.

Good seal strength (peeling strength 6.8 N).

Example 10:

The copolymer P8 according to Example 8, (comprised of 50 parts ethyl methacrylate and 50 parts butyl methacrylate (J=23 ml/g)) was dissolved in a mixture of 80% 2-propanol, 15% acetone, and 5% 4-hydroxy-4-methyl-2-pentanone, and applied, with the aid of a grooved doctor, as a 10 micron thick copolymer layer on a 100 micron thick polystyrene film (VESTYRON® 624, containing 10 weight % of CARIFLEX® TR 1102) (see also Example 9). The result was a 120 micron thick plastic film which could be sealed to a polystyrene strip (sealing surface 1.5×1.0 cm) with good seal strength, at 160° C., pressure 2.5 bar, and time 0.5 sec. (Peeling strength was c. 6 N.)

Example 11:

A 10 micron thick layer of a copolymer P1 (Example 1) was applied to a 140 micron thick polystyrene-copolymer blend film as a support material, by the method of Example 9.

Composition of the film material:

75% K-RESIN® KR05, a product of Phillips Petroleum Co., Bartlesville, Okla. 74004, U.S.A., and 25% copolymer P3 (Example 3), which is a copolymer comprised of 50 weight % of ethyl methacrylate and 50 weight % of butyl methacrylate, J= 51 ml/g.

The result was a composite film which could be sealed within 0.5 sec at 180° C. and 2.5 bar.

Example 12: Production of an impact-strength-modified copolymer P9 by two-stage emulsion polymerization:

The following monomer emulsions in water with 0.3% Na salt of tetradecanesulfonic acid were charged successively to a heated polymerization vessel equipped with a stirrer, thermometer, and reflux condenser (according to U.S. Pat. No. 4,613,118):

200 g of a mixture of 99.4% methyl methacrylate and 0.6% allyl methacrylate;

400 g of a mixture of 98% butyl acrylate and 2% allyl methacrylate; and 400 g of a mixture of 49.5% ethyl methacrylate and 49.5% butyl methacrylate, along with 1% dodecyl mercaptan.

A three-phase emulsion polymer resulted.

Following cooling, a dispersion was obtained with solids content 50%. The dispersion particles had mean diameter 398 nm.

To recover the polymer solid, the dispersion was freeze-coagulated by freezing at −16° C. and thawing in warm water. After washing, filtering, and drying, a solid was obtained which could be processed in a measuring kneader (HAAKE RHEODIVE 5000) at 200° C. (torque 4.0 Nm).

Example 13: Production of a coextrudable sealant S1:

750 g of the impact-strength-modified copolymer P9 obtained according to Example 12 was mixed with 250 g of the low molecular weight copolymer P6 according to Example 6, and these were granulated together, and degassed. The sealant S obtained was appreciably more flowable than the sealant according to Example 12 (torque 2.2 Nm at 200° C.).

Example 14: Production of a coextruded sealant S2:

50 parts of the multistage emulsion polymer P9 obtained according to Example 12 were mixed with 50 parts of the low molecular weight copolymer according to Example 6, resulting in a yet more flowable sealant (torque 0.6 Nm at 200° C.).

Example 15: Production of a two-layer sealing film by coextrusion:

In a coextrusion apparatus a 10–20 micron thick layer of the coextrudable sealant S2 according to Example 14 was produced on a 200 micron thick layer of an impact resistant polystyrene (mixture of 90 parts VESTYRON® 624 and 10 parts CARIFLEX® TR 1102).

Product dimensions:

Length 50 m, wound.

Width 120 mm.

Thickness 210–220 micron.

Main extruder material: Mixture of 90 parts VESTYRON® 624 and 10 parts CARIFLEX° TR 1102.

Main extruder temperature 200° C. (nozzle).

Coextruder material: Coextrusion compound according to Example 14

Coextruder temperature 220° C. (nozzle).

Withdrawal speed 1.8 re/min.

A uniform coextrudate was obtained with a very uniform distribution of the sealant S on the polystyrene support Example 16: Production of a two-layer sealing film by coextrusion:

The procedure was as in Example 15, except that other layer thicknesses were chosen:

Overall film thickness 300 micron.

Thickness of the sealing layer S 40–60 micron.

Example 17: Heat sealing tests with the sealing films according to Examples 15 and 16:

The film according to Example 15 was stamped out into the form of a yogurt cup cover and was sealed onto a yogurt cup comprised of impact resistant polystyrene (300 ml, diameter 75 mm). A sealing temperature of 160° C. was needed for a hermetic seal of the cup at 0.75 bar in 0.5 sec.

When the thicker film according to Example 16 was used, under the same sealing conditions a sealing temperature of 180° C. was needed.

Example 18: Production of a sealant S3:

50 parts by weight (pbw) CARIFLEX® TR 1102 and 50 pbw of the copolymer P1 according to Example 1 were mixed at 190° C. A torque of 3.0 N-m was measured.

Example 19: Production of a two-layer film with improved peeling behavior after sealing to impact resistant styrene:

The sealant S3 obtained according to Example 18 was pressed onto a 60–70 micron thick film at 200° C. Then the thus obtained film was pressed onto 130 micron thick films comprised of impact resistant polystyrene (VESTYRON® 624, containing 10% of CARIFLEX® TR 1102). The two-layer film produced had good handling properties.

Polystyrene strips 1.5 cm wide (sealing surface 1.5×1.0 cm) were sealed with this film. Sealing pressure was 2.5 bar. At a sealing temperature of 180° C. and sealing duration 0.5 sec, a good seal was obtained. Particularly noteworthy was the good peeling behavior when the seal was opened.

Example 20: Production of a two-layer film with improved peeling behavior after sealing to impact resistant polystyrene:

30 pbw CARIFLEX® TR 1102 and 70 pbw copolymer P5 according to Example 5 were mixed in a kneader at 191° C. Torque was 0.9 Nm. This flowable mixture was pressed at 190° C. onto a 120 micron thick film, as described in Example 19. Then a 130 micron thick film of impact resistant polystyrene (VESTYRON® 624, containing 10% of CARIFLEX® TR 1102) was pressed on. The result was a two-layer film with good handling properties which could be sealed to impact resistant polystyrene. This seal also had good, compliant, elastic peeling behavior upon opening.

Example 21: Production of a two-layer film:

In a coextrusion apparatus according to Example 15, a sealant mixture S4 comprised of 30 weight % CARIFLEX® TR 1102;

50 weight % copolymer according to Example 1 (with a higher J-value of 25 ml/g); and 20 weight % K-RESIN® KK38 (product of Phillips Petroleum)

was coextruded onto a polystyrene block copolymer (K-RESIN® KK38) as a support material T. The thickness of the coextrusion layer was 20 micron. Total thickness of the film was 280 micron.

Covers were punched out of this film. These covers were sealed onto 200 ml polystyrene cups (diameter 75 mm), at pressure 0.8 bar, temperature 180° C., in 0.5 sec. The seal on the cups was good. This seal also had good, compliant, elastic peeling behavior upon opening.

Having now fully described the invention, it will be apparent to one of ordinary skill in the art that many changes and modifications can be made thereto without departing from the spirit or scope of the invention as set forth herein.

What is claimed as new and desired to be secured by letters patent of the United States is:

1. A recyclable heat-sealable plastic film comprising,
   (i) a support layer comprised of an impact resistant polystyrene, and
   (ii) a sealing layer, consisting essentially of
      a) 20–100 weight % of a copolymer P consisting essentially of:

(p1) 20–90 weight % of methyl methacrylate, ethyl methacrylate or a combination thereof;

(p2) 10–80 weight % of at least one monomer of formula (I):

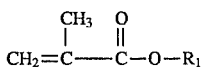

wherein $R_1$ represents a $C_{3-24}$ alkyl group; and (p3) 0–10 weight % of one or more monomers which is/are copolymerizable with and different from the monomers (p1) and (p2) wherein the monomer or monomers are selected from the group consisting of methacrylic acid and derivatives thereof, $C_{1-20}$ esters of acrylic acid, and styrene; and b) 0–80 weight % of one or more block copolymers of at least one block of one or more monomers selected from the group consisting of styrene, α-methyl styrene and alkyl substituted styrene, and at least one block selected from the group consisting of isoprene and butadiene; or hydrogenated block copolymers thereof;

wherein the composition of said sealing layer and the composition of said support layer form a compatible mixture when blended together and wherein said sealing layer adheres directly to said support layer without any primer.

2. The heat-sealable plastic film according to claim 1, wherein said impact resistant polystyrene resin comprises a polymeric member selected from the group consisting of styrene-butadiene multiblock copolymers with a content of polybutadiene of > 50 weight %, styrene-butadiene multi-block copolymers with a content of polybutadiene of 15–50 weight %, an impact-strength-modified polystyrene produced by radical polymerization, and mixtures thereof.

3. The heat-sealable plastic film according to claim 2, wherein the impact resistant polystyrene resin comprises a mixture of said polymeric member with a transparent polystyrene.

4. The heat-sealable plastic film according to claim 1, wherein said impact resistant polystyrene resin comprises 40–100 weight % of a block copolymer comprising:

A) 15–85 weight % styrene, and

B) 85–15 weight % butadiene, isoprene or a mixture thereof.

5. The heat-sealable plastic film according to claim 1, wherein said copolymer P is present in the form of an elastomer-copolymer graft product having a core-and-shell structure wherein a shell comprising said copolymer P is grafted onto an acrylate rubber core and wherein the elastomer core phase comprises 1–65 wt % based on the weight of the elastomer-copolymer graft product.

6. The heat-sealable plastic film according to claim 1, wherein said support layer comprises 0.1–50 weight %, based on the total weight of said support layer, of copolymer P.

7. The heat-sealable plastic film according to claim 1, wherein said sealing layer comprises said impact resistant polystyrene resin in the amount of 0.1–80 weight % based on the total weight of said sealing layer.

8. The heat-sealable plastic film according to claim 1, wherein said sealing layer comprises:

(i) 45–65 weight % of copolymer P, (ii) 10–35 weight % of a block copolymer with a butadiene content > 50 weight percent, and (iii) 10–35 weight % of a block copolymer with a butadiene content of 15–50 weight percent wherein said block copolymer comprises at least one block of one or more monomers selected from the group consisting of styrene, α-methyl styrene and alkyl substituted styrene, and at least one block selected from the group consisting of isoprene and butadiene.

9. The heat-sealable plastic film according to claim 1, wherein the overall thickness of said plastic film is at most 500 microns.

10. The heat-sealable plastic film according to claim 9, wherein the thickness of said support layer is 5–495 microns and the thickness of said sealing layer is 2–495 microns.

11. The heat-sealable plastic film according to claim 1, which further comprises an additional layer on the support layer opposite the sealing layer which prevents adhesion of said plastic film to a sealing head.

12. The heat-sealable plastic film according to claim 11, wherein said additional layer comprises a plastic which has a softening point above 160° C.

13. A recyclable laminate or composite, comprising a heat-sealable plastic film comprising:

(i) a support layer comprised of an impact resistant polystyrene, and (ii) a sealing layer, consisting essentially of a) 20–100 weight % of a copolymer P consisting essentially of:

(p1) 20–90 weight % of methyl methacrylate, ethyl methacrylate or a combination thereof;

(p2) 10–80 weight % of at least one monomer of formula (I):

wherein $R_1$ represents a $C_{3-24}$ alkyl group; and (p3) 0–10 weight % of one or more monomers which is/are copolymerizable with and different from the monomers (p1) and (p2) wherein the monomer or monomers are selected from the group consisting of methacrylic acid and derivatives thereof, $C_{1-20}$ esters of acrylic acid, and styrene; and (b) 0–80 weight % of one or more block copolymers of at least one block of one or more monomers selected from the group consisting of styrene, α-methyl styrene and alkyl substituted styrene, and at least one block selected from the group consisting of isoprene and butadiene; or hydrogenated block copolymers thereof;

wherein the composition of said sealing layer and the composition of said support layer form a compatible mixture when blended together and wherein said sealing layer adheres directly to said support layer without any primer.

14. A method for sealing a container comprising heat-sealing a recyclable plastic film to said container, wherein said plastic film comprises:

(i) a support layer comprised of an impact resistant polystyrene, and (ii) a sealing layer, consisting essentially of a) 20–100 weight % of a copolymer P consisting essentially of:

(p1) 20–90 weight % of methyl methacrylate, ethyl methacrylate or a combination thereof;

(p2) 10–80 weight % of at least one monomer of formula (I):

wherein $R_1$ represents a $C_{3-24}$ alkyl group; and (p3) 0–10 weight % of one or more monomers which is/are copolymerizable with and different from the monomers (p1) and (p2) wherein the monomer or monomers are selected from the group consisting of methacrylic acid and derivatives thereof, $C_{1-20}$ esters of acrylic acid, and styrene; and (b) 0–80 weight % of one or more block copolymers of at least one block of one or more monomers selected from the group consisting of styrene, α-methyl styrene and alkyl substituted styrene, and at least one block selected from the group consisting of isoprene and butadiene; or hydrogenated block copolymers thereof;

wherein the composition of said sealing layer and the composition of said support layer form a compatible mixture when blended together and wherein said sealing layer adheres directly to said support layer without any primer and are mutually adhesive to said container.

* * * * *